United States Patent
Nakamura et al.

(10) Patent No.: US 10,011,724 B2
(45) Date of Patent: Jul. 3, 2018

(54) ENVIRONMENTAL BARRIER COATING

(71) Applicants: IHI Corporation, Koto-ku (JP); JAPAN FINE CERAMICS CENTER, Nagoya-shi (JP)

(72) Inventors: Takeshi Nakamura, Tokyo (JP); Takashi Tamura, Tokyo (JP); Satoshi Kitaoka, Aichi (JP); Naoki Kawashima, Aichi (JP)

(73) Assignees: IHI CORPORATION, Koto-ku (JP); JAPAN FINE CERAMICS CENTER, Nagoya-shi (JP)

(*) Notice: Subject to any disclaimer, the term of this patent is extended or adjusted under 35 U.S.C. 154(b) by 0 days.

(21) Appl. No.: 15/469,034

(22) Filed: Mar. 24, 2017

(65) Prior Publication Data
US 2017/0190920 A1    Jul. 6, 2017

Related U.S. Application Data

(63) Continuation of application No. PCT/JP2016/055437, filed on Feb. 24, 2016.

(30) Foreign Application Priority Data

Mar. 2, 2015 (JP) ................. 2015-040594

(51) Int. Cl.
*B32B 9/00* (2006.01)
*C09D 5/08* (2006.01)
*C04B 41/89* (2006.01)

(52) U.S. Cl.
CPC .............. *C09D 5/084* (2013.01); *C04B 41/89* (2013.01)

(58) Field of Classification Search
CPC ......... B32B 18/00; C04B 41/87; C04B 41/89; C09D 5/084; F01D 5/28; F01D 5/284; F01D 5/286; F01D 5/288; F01D 25/007
See application file for complete search history.

(56) References Cited

U.S. PATENT DOCUMENTS 6,129,954 A    10/2000    Spitsberg et al.
6,139,791 A *  10/2000    Chen ................ C04B 35/597
                                                    264/642

(Continued)

FOREIGN PATENT DOCUMENTS

JP    61-55301    3/1986
JP    3-5362      1/1991

(Continued)

OTHER PUBLICATIONS

MaterialsProject.org, Yb2Si2O7 Material Details [ https://materialsproject.org/materials/mp-4300/] (accessed: Nov. 28, 2017). (Year: 2017).*

(Continued)

*Primary Examiner* — David Sample
*Assistant Examiner* — Elizabeth Collister
(74) *Attorney, Agent, or Firm* — Oblon, McClelland, Maier & Neustadt, L.L.P.

(57) ABSTRACT

A coating used in a vapor-oxidative atmosphere has a first layer including SIALON and a second layer covering the first layer and being exposed to the atmosphere, the second layer including mullite, wherein the first layer and the second layer get in contact with each other.

8 Claims, 1 Drawing Sheet

(56) References Cited

U.S. PATENT DOCUMENTS

| | | | | |
|---|---|---|---|---|
| 6,759,151 | B1* | 7/2004 | Lee | C04B 41/009 416/241 B |
| 2003/0003328 | A1 | 1/2003 | Spitsberg et al. | |
| 2009/0324930 | A1* | 12/2009 | Tulyani | C04B 41/52 428/316.6 |
| 2010/0080984 | A1* | 4/2010 | Lee | C04B 35/16 428/334 |
| 2012/0077004 | A1* | 3/2012 | Kirby | C04B 41/009 428/215 |
| 2015/0079371 | A1 | 3/2015 | Nakada et al. | |

FOREIGN PATENT DOCUMENTS

| | | |
|---|---|---|
| JP | 5-117065 | 5/1993 |
| JP | 5-270957 | 10/1993 |
| JP | 8-67549 | 3/1996 |
| JP | 8-67583 | 3/1996 |
| JP | 8-73259 | 3/1996 |
| JP | 8-143375 | 6/1996 |
| JP | 10-157014 | 6/1998 |
| JP | 11-12050 | 1/1999 |
| JP | 2005-97007 | 4/2005 |
| JP | 2013-248852 | 12/2013 |

OTHER PUBLICATIONS

Webmineral.com, Mullite Mineral Data [http://webmineral.com/data/Mullite.shtml#.Wh14fjN97DB] (accessed: Nov. 28, 2017). (Year: 2017).*

International Search Report dated May 10, 2016 in PCT/JP2016/055437, filed on Feb. 24, 2016 (With English Translation).

Written Opinion dated May 10, 2016 in PCT/JP2016/055437, filed on Feb. 24, 2016.

Hajime Kiyono et al., "Improvement of high-temperature oxidation resistance to water vapor by alumina coating on beta-sialon ceramic," Transactions of the Materials Research Society of Japan, vol. 35 No. 3, 2010, pp. 4.

K.N. Lee, "Current status of environmental barrier coatings for Si-Based ceramics," Surface and Coatings Technology, vols. 133-134, 2000, pp. 7.

Office Action dated Apr. 13, 2018; in Canadian Patent Application No. 2,973,948, document AA cited therein.

\* cited by examiner

ENVIRONMENTAL BARRIER COATING

CROSS-REFERENCE TO RELATED APPLICATIONS

This application is a Continuation Application of PCT International Application No. PCT/JP2016/055437 (filed Feb. 24, 2016), which is in turn based upon and claims the benefit of priority from Japanese Patent Application No. 2015-040594 (filed Mar. 2, 2015), the entire contents of which are incorporated herein by reference.

BACKGROUND

Technical Field

The disclosure herein relates to a coating covering an engine or such of an aircraft, and in particular to a coating protecting the engine or such from high-temperature and oxidative environments.

Description of the Related Art

To improve various properties including energy efficiency of engines of aircrafts is a persistently remaining technical problem. While one of key factors for improving the energy efficiency is, as being well-known, weight reduction, another exemplified measure right along therewith could be elevation of the operating temperature. Operation of an engine in higher temperatures improves thermal efficiency thereof, thereby creating an expectation of improvement of energy efficiency.

While nickel-based superalloys have been used as heat-resistant materials, ceramic matrix composites (CMCs) have been recently sought to apply for the purposes of further weight reduction and improvement of heat resistance. A CMC is a material that consists of fabrics of silicon carbide (SiC) fibers embedded in a matrix of SiC (SiC/SiC) for example. There may be various combinations such C/C, C/SiC, SiC/$Si_3N_4$ and $Al_2O_3$/$Al_2O_3$.

SiC has a remarkable heat resistance and silica ($SiO_2$) as its oxidation product can protect SiC from further oxidation. On the other hand, air sucked by the engine contains a non-negligible amount of water vapor. This water vapor could react with silica at elevated temperatures to change it into volatile hydroxides and consequently exhaustion of SiC is unavoidable. Arts for covering CMCs with some environmental barrier coatings (EBCs) are proposed in order to prevent this high temperature vapor oxidation. The following literatures disclose related arts.

United States Patent Application Publication 2003/0003328 A1

Japanese Patent Application Laid-open No. H11-12050

SUMMARY

Mullite (aluminum silicate typically expressed as $3Al_2O_3.2SiO_2$) is stable even in a high-temperature oxidative atmosphere and is often used as a coating for protecting a base body. The present inventors, however, have observed that mullite coatings, placed in cycle conditions where a room temperature and elevated temperatures alternate, as a simulation of practical conditions, would often decline in quality of environmental resistance. Its main source is quite unlikely to be formation of defects in the coatings by so-called thermal shock. The reason is that interposition of any layer therebetween to absorb the difference in thermal expansion coefficients between mullite and the base body cannot sufficiently prevent this quality decline.

The present inventors have keenly studied the source of the problem and thereby reached a coating in accordance with the disclosure herein.

According to an aspect, a coating used in a vapor-oxidative atmosphere is comprised of a first layer including SiAlON and a second layer covering the first layer and being exposed to the atmosphere, the second layer including mullite, wherein the first layer and the second layer get in contact with each other.

DETAILED DESCRIPTION OF THE EMBODIMENTS

Exemplary embodiments will be described hereinafter with reference to the appended drawings.

A coating in this disclosure can be used to protect a base body from a vapor-oxidative atmosphere where the temperature is beyond 1100 degrees C. for example and is particularly preferably available in, but not limited to, a high temperature atmosphere containing water vapor for the purpose of protecting CMCs such as SiC/SiC from the atmosphere.

Figure 1:
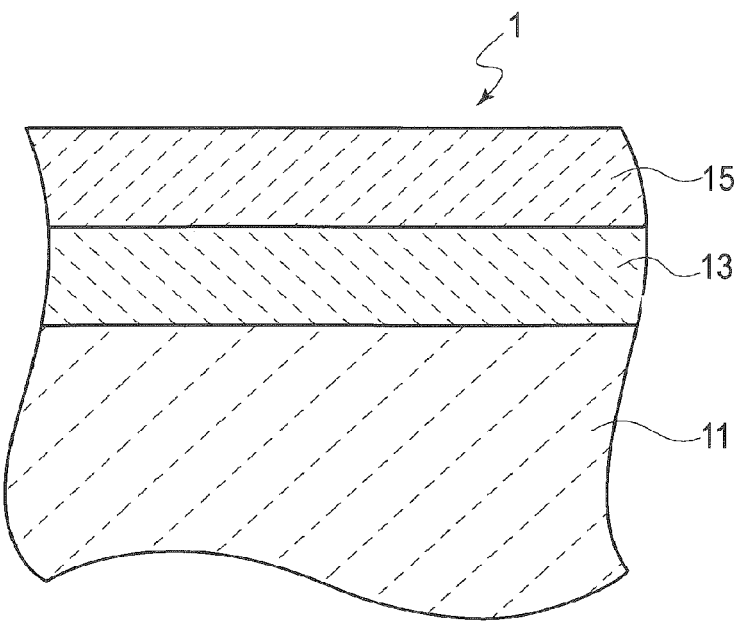
FIG. 1 is a schematic cross sectional view of a coating according to an embodiment.

Referring to FIG. 1, a heat resistant member 1 is comprised of a base body 11, a first layer 13 covering the base body 11 and a second layer 15 covering the first layer 11 and being exposed to the atmosphere. The base body 11 is a heat resistant material formed of a CMC including SiC/SiC for example.

The first layer 13 includes or consists essentially of SiAlON. SiAlON is a ceramic generally recognized as a solid solution of silicon nitride ($Si_3N_4$) and alumina ($Al_2O_3$). Due to the polymorphism of the silicon nitride crystals (alpha-$Si_3N_4$ and beta-$Si_3N_4$ for example), SiAlON is also polymorphous. Among them, beta-prime-SiAlON is advantageous in the present embodiment in light of its high melting point and inability of phase transformation in the temperature range at issue. Or, it may further contain other phases such as O-prime-SiAlON, X-SiAlON and alumina. To enjoy the capacity for supplying aluminum ions, smaller contents of the other phases are more effective. The other phases can be therefore less than 50 vol % relative to SiAlON, or preferably less 30 vol %, or more preferably less than 10 vol %.

The first layer 13 intervenes between the base body 11 and the second layer 15. While preferably the first layer 13 is directly in contact with, and bonded with, the base body 11, another layer may intervene therebetween. Further preferably the first layer 13 is substantially fully covered by the second layer 15 so as not to expose itself to the oxidative atmosphere. Still alternatively, while the first layer 13 and the second layer 15 may get in contact with, and be bonded with, each other, as will be described later, another layer in a form of a thin layer or any other form may intervene between the first layer 13 and the second layer 15.

The second layer 15 includes or consists essentially of mullite. Mullite is an aluminum silicate typically expressed as $3Al_2O_3.2SiO_2$ as described already. Mullite may alternatively be slightly deviated from the stoichiometry.

The second layer 15 may include the other phases, such as $Re_2Si_2O_7$ where Re is one or more of Y, Yb, Er and Dy.

To enjoy the protective ability by mullite, smaller contents of the other phases are more effective. The other phases can be therefore less than 50 vol % relative to mullite, or preferably less than 30 vol %, or more preferably less than 10 vol %.

The second layer 15 covers the first layer 13 and exposes itself to the atmosphere as described above. The second layer 15 is generally exposed to the atmosphere directly. Alternatively, another layer may partly or fully cover the second layer 15 as well. This additional layer may have a characteristic to wear off after use for a definite period for the purpose of preventing foreign substances from adhering thereto.

Each layer, if thicker, may be more resistive to the environment, but, if overly thick, may be likely to have any defects such as cracks. Each layer is thus in the range of 5-300 micrometers for example, or in the range of 10-100 micrometers. While the second layer 15 is layered on the first layer 13, plural combinations thereof may be accumulated to form a multilayer.

Figure 2:
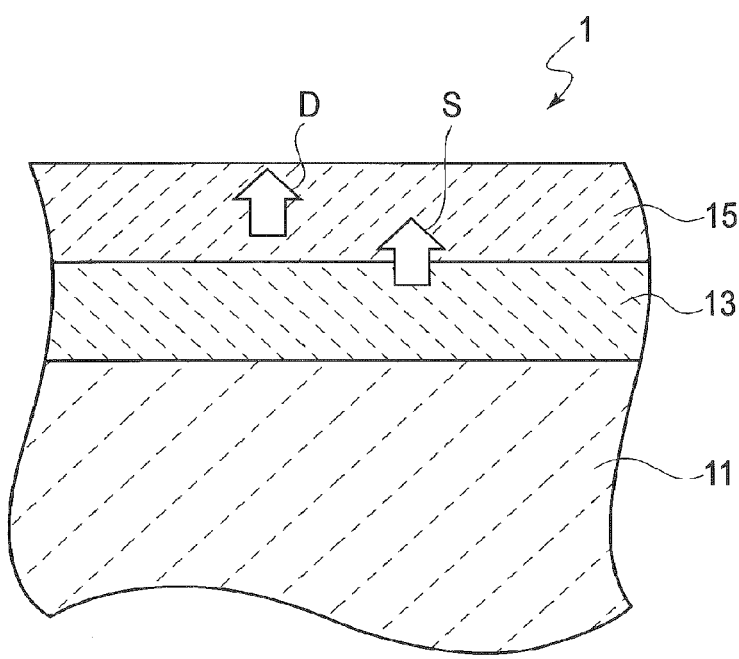
FIG. 2 is a schematic cross sectional view of the coating placed in a vapor-oxidative atmosphere.

Referring to FIG. 2, when the heat resistant member 1 with the coating according to the present embodiment is placed in a high-temperature oxidative atmosphere, oxygen ions ($O^{2-}$) come to be more abundant in the second layer 15 and it results in a concentration gradient in which the concentration of the oxygen ions ($O^{2-}$) reduces from the top surface toward the lower surface. As balancing therewith, aluminum ions ($Al^{3+}$) tend to diffuse toward the surface as indicated by an arrow D, and more specifically aluminum ions have a concentration gradient in a counter direction to that of the oxygen ions.

Without SiAlON, the second layer 15 around its bottom would have a tendency to destabilize the mullite as developing relative depletion of aluminum ions. If the mullite decomposes, silica such as cristobalite will instead come into being, which is a decomposition reaction accompanied by volume change. Cristobalite is of itself polymorphous and brings about phase transformation at about 270 degrees C. between the beta phase (high-temperature phase) and the alpha phase (low-temperature phase), which also causes volume change.

These volume changes impair adhesion of the mullite layer or cause the formation of defects such as cracks in the mullite layer. Particularly in practical uses, the coating is exposed to a room temperature and elevated temperatures reciprocally and thus brings about the aforementioned phase transformation repeatedly. Therefore impairment of adhesion and creation of defects come to be non-negligible. Creation of delamination or defects necessarily deteriorates the quality of environmental resistance.

In the present embodiment, as the first layer 13 supplies aluminum ions as indicated by an arrow S, the mullite is prevented from decomposing. As supply of the aluminum ions succeeds, the first layer 13 loses aluminum ions in part but this merely causes change in the solid solution ratio of $Al_2O_3$ to $Si_3N_4$ in SiAlON, which generally does not cause volume change. More specifically, it should not raise any concern for the creation of problematic volume change in both the first layer 13 and the second layer 15.

It is additionally noted that the outward diffusion of the aluminum ions in the mullite and degradation of the coating caused by the resultant mullite decomposition are discoveries made by the present inventors. The combination of mullite with SiAlON has been reached from this discovery of the source of the problem.

As will be understood from the above descriptions, it is preferable not to place a barrier against the diffusion between the first layer 13 and the second layer 15 in order to prevent decomposition of the mullite caused by supply of the aluminum ions. Thus as described above, the first layer 13 is preferably in direct contact with, and bonded with, the second layer 15. Any other phase may be, nevertheless, interposed therebetween as long as the diffusion of the aluminum ions is allowed, and this can be still acknowledged as a structure with substantially direct contact. Such a structure may have any variant, in which particles are dispersed around the interface while in the form of a thin layer for example, or any other structure is possible. In a case where any layer intervenes, it may be limited to a layer of less than 1 micrometer.

If the layer 13 was excessively thin as compared with the second layer 15, it would have a shortage of capacity for supplying aluminum ions. Or otherwise, the second layer 15 would have a shortage of the ability of protection. The thickness of the first layer 13 compared to the thickness of the second layer 15 is therefore preferably in the range of 0.1 to 2.0, or more preferably in the range of 0.2 to 1.0.

While SiAlON is a solid solution of $Si_3N_4$ and $Al_2O_3$ as described above, any given ratio could not always stabilize the beta-prime phase. The beta-prime phase becomes unstable as a single phase when z goes beyond 4.2 where SiAlON is represented as a general formula $Si_{6-z}Al_zO_zN_{8-z}$, and requires the co-existence of the $Al_2O_3$ phase. If outward diffusion of the aluminum ions causes change in the co-existence ratio between the $Al_2O_3$ phase and the beta-prime SiAlON phase, it might give rise to the creation of defects in the layer. To have the SiAlON in the first layer 13 be a single phase of the beta-prime phase is effective for preventing this. More specifically, z is preferably in the range of $0<z\leq4.2$. A larger z increases the capacity of supplying aluminum ions. Therefore, more preferably, z is in the range of $1.0\leq z$, and further preferably in the range of $2.0\leq z$. If z is smaller, the $Al_2O_3$ phase is unlikely to crystallize. Therefore, more preferably, z is in the range of $z\leq3.5$, still preferably in the range of $z\leq3.0$.

Mullite may have a composition deviating from its stoichiometry as described already. Where it is expressed as $Al_{4+2x}Si_{2-2x}O_{10-x}$ for example, x is preferably in the range of $0.20\leq x\leq0.39$. In light of suppression of aluminum ion diffusion, x is more preferably in the range of $0.20\leq x\leq0.34$, and further preferably in the range of $0.23\leq x\leq0.30$. In the second layer 15, mullites having compositions distinct from each other may be mixed or mutually layered.

Either or both of the first layer 13 and the second layer 15 may have compositional gradients. In the second layer 15 for example, the Al/Si ratio may gradually increase (x increases in the above chemical formula) toward its surface. This is advantageous for suppressing exhaustion by the vapor oxidation at its surface and is also advantageous for absorbing the difference in thermal expansion coefficients relative to the first layer 13.

The coating as structured in a way described above can be produced by any proper method. Aerosol deposition, electron beam evaporation, and laser chemical evaporation can be exemplified as the production method.

By the aerosol deposition for example, the coating can be produced in a way described below. At a time for forming the first layer 13 for example, powder of SiAlON (or mullite at a time of forming the second layer 15) is dispersed in a carrier gas such as nitrogen, argon, helium, oxygen, or air to form an aerosol and the aerosol is ejected onto a base member (or the first layer) to form the coating. By gradually changing the composition of the powder, a coating with a composition gradient can be produced. Or, by rapidly changing supplied powders from SiAlON to mullite while the coating formation is continued, continuous production of the first layer 13 and the second layer 15 is enabled. Successively after the coating formation, smoothing its surface or heat treatment may be executed in combination.

For the purpose of verifying the effects by the present embodiment, mock layered products have been produced in a way as described below.

Powder generally available under a trade name of KM-101 (KCM Corporation) was used as mullite powder. This powder was uniaxially pressed under a pressure of 19.6 MPa and was thereafter pressed by cold isostatical press under a pressure of 245 MPa to form green bodies of a columnar shape and a hollow columnar shape. These green bodies were sintered under ordinary pressure at 1300 degrees C. for 50 hours to form columnar test pieces M1 of 15 mm (outer diameter)×5 mm (height) and hollow columnar test pieces M2 of 15 mm (outer diameter)−2.1 mm (inner diameter)×0.2 mm (height).

A silicon ingot with a purity of 99.999999999% (Shin-Etsu Chemical Co., Ltd.) was machined into a piece of a columnar shape of 2 mm (outer diameter)×0.2 mm (height), which is served for a silicon test piece. This is so dimensioned as to just fit in the hollow of the test piece M2.

Powder generally available under a trade name of BSI3-001B (AG Materials Inc.) was used (z=3 in $Si_{6-z}Al_zO_zN_{8-z}$). This powder was uniaxially pressed under a pressure of 19.6 MPa to form green bodies of a columnar shape. This green body was pressed by hot press under a pressure of 40 MPa at 1750 degrees C. for 2 hours in a nitrogen atmosphere at 0.7 MPa to form a beta-prime SiAlON test piece of a columnar shape of 2 mm (outer diameter)×0.2 mm (height).

The silicon test piece and the beta-prime SiAlON test piece were respectively fit in the hollows of the test pieces M2 and were further put in between pairs of upper and lower test pieces M1. These assemblies were hot-pressed under a pressure of 50 MPa in a depressurized atmosphere at 1600 degrees C. for 1 hour to form joined bodies. Only one face of each joined body was lapped to reduce the thickness of the mullite layer toward the embedded silicon or beta-prime SiAlON body down to 0.25 mm. This mullite layer with reduced thickness simulates a mullite coating exposed to the atmosphere.

The mullite/silicon joined body and the mullite/beta-prime-SiAlON joined body were heated at 1400 degrees C. for 10 hours and the joined bodies after the heating were vertically cut and polished. The cross sectional faces were observed by SEM.

In the mullite layer with reduced thickness of the mullite/silicon joined body, around an interface with the silicon layer, granular structures distinguishable from mullite were observed. In the mullite layer without thickness reduction, even around an interface, similar structures could not be observed. More specifically, the granular structures are considered to be specific to exposure to the atmosphere.

While EDS elemental mapping was executed in the same visual field, non-uniformity in Al, Si, O distributions was acknowledged and the non-uniformity was acknowledged to accord with the granular structures. More specifically, this observation suggests that mullite decomposes into silica so as to form the granular structures. It is considered that mullite around the bottom of the mullite layer, without the SiAlON layer, tends to decompose.

In the mullite/beta-prime-SiAlON joined body, even after the heating, any granular structure similar to those described above could not be observed. EDS elemental mapping showed uniformity of Al, Si, O distributions. More specifically, it is acknowledged that the beta-prime SiAlON layer in contact with the mullite layer prevents decomposition of mullite.

From the test results as described above, it is understood that a coating with mutual contact between a first layer including SiAlON and a second layer including mullite will keep its quality of environmental resistance.

Although certain embodiments have been described above, modifications and variations of the embodiments described above will occur to those skilled in the art, in light of the above teachings.

INDUSTRIAL APPLICABILITY

A coating that keeps its quality of environmental resistance even if it is placed at a room temperature and at an elevated temperature reciprocally is provided.

What is claimed is:
1. A coating used in a vapor-oxidative atmosphere and covering a ceramic matrix composite material, comprising:
   a first layer including SiAlON; and
   a second layer covering the first layer and being exposed to the atmosphere, the second layer consisting essentially of mullite and $Re_2Si_2O_7$, the $Re_2Si_2O_7$ being less than 50 vol % relative to mullite, where Re is one or more of Y, Yb, Er, and Dy,
   wherein the first layer and the second layer get are in contact with each other,
   wherein the SiAlON is represented as $Si_{6-z}Al_zO_zN_{8-z}$, where z is in a range of $0<z\leq4.2$.
2. The coating of claim 1, wherein the second layer is 5-300 micrometers in thickness.
3. The coating of claim 1, wherein the first layer is 5-300 micrometers in thickness and is bonded with and covers a base body.
4. The coating of claim 1, wherein $Re_2Si_2O_7$ in the second layer is less than 30 vol % relative to mullite.
5. The coating of claim 1, wherein $Re_2Si_2O_7$ in the second layer is less than 10 vol % relative to mullite.
6. The coating of claim 1, wherein z is in a range of $0<z\leq3.0$.
7. The coating of claim 1, wherein the mullite has a composition of $Al_{4+2x}Si_{2-2x}O_{10-x}$, where x is in a range of $0.20\leq x\leq0.39$.
8. The coating of claim 7, wherein x is in a range of $0.23\leq x\leq0.30$.

* * * * *